Aug. 8, 1967        J. B. REYNOLDS        3,334,696

ICE FISHING AID

Filed Oct. 16, 1964

INVENTOR.
Jack B. Reynolds

BY
Griswold & Burdick
ATTORNEY 3,334,696
ICE FISHING AID
Jack B. Reynolds, Ludington, Mich., assignor to The Dow Chemical Company, Midland, Mich., a corporation of Delaware
Filed Oct. 16, 1964, Ser. No. 404,462
1 Claim. (Cl. 175—18)

This invention relates to a novel method of making holes in ice for purposes of ice fishing, and more particularly to such a method in which substantially no mechanical work is required.

In the past, considerable labor has been expended, particularly by ice fishermen, in drilling, spudding, chopping, augering, or other mechanical methods in order to obtain access to water located beneath the layer of ice formed on bodies of water in winter.

Spudding is the most common method of putting holes in ice for ice fishing. In spudding, a heavy ice chisel is generally employed to chop a hole in the ice by means of repeated vertical strokes. Spudding is most often a tedious process and requires much work. Since ice fishing necessarily takes place under conditions of low temperature, the fisherman is usually warmly dressed. As the fisherman works to obtain access to the water below the ice, he generally tends to become overly warm and perspires because of hard work in heavy clothing. Once the work is completed, perspiration on his clothing may cause him to chill during the wait for his catch. Such a chill is not only uncomfortable, but could, and in many cases does, prove to be a hazard to the health and well being of the fisherman. Of course, the hard work involved is not appreciated by some ice fishermen.

Further, many ice spuds are lost each year. As the fisherman breaks through the layer of ice, the inertia of his downward stroke often carries the spud out of his work-fatigued hands to the bottom of the lake. This is indeed a frustrating experience and a needless expense as well.

I have discovered a novel method whereby a fisherman can sit back and relax while a hole of the desired shape and size is formed through the ice.

Illustrative of the present invention are the accompanying drawings, in which.

Figure 1:
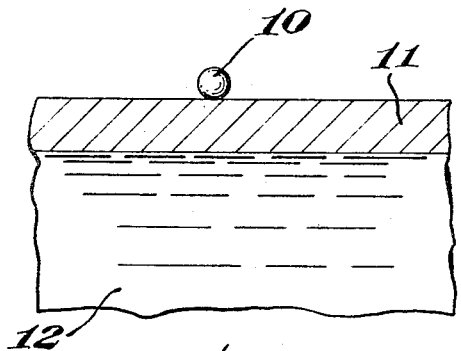
FIGURE 1 shows a mass of freezing point depressant positioned on an ice layer.
Figure 2:
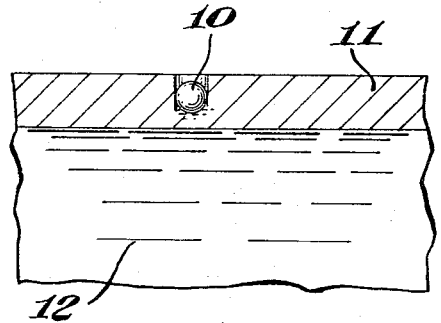
FIGURE 2 shows the mass of freezing point depressant partially through the ice layer.
Figure 3:
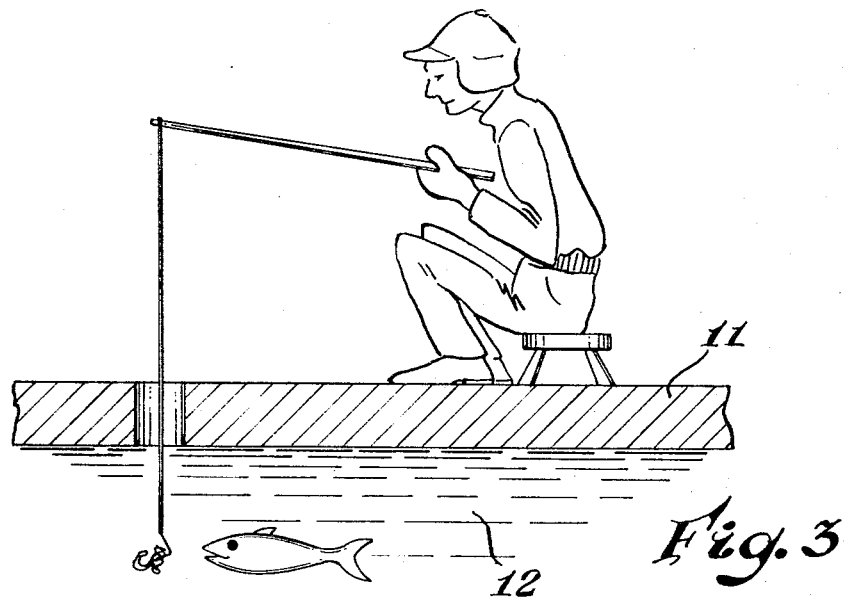
FIGURE 3 shows a fisherman using the hole in the ice layer obtained by the method of the present invention.

In accordance with my invention, a substantially compacted mass 10 of an ionizable freezing point depressant having a predetermined shape is positioned at rest on and in contact with the upper surface of an ice layer 11 which covers a body of water 12. The freezing point depressant 10 lowers the freezing point of the ice 11, thereby melting the ice 11 in contact therewith. As ice 11 is melted, the compact mass 10 of freezing point depressant sinks due to its own weight and remains in contact with the ice 11 beneath the water formed by melting. Melting progresses as the compact mass 10 of freezing point depressant moves downward. Melting continues until the compact mass penetrates the lower surface of the ice layer 11, thereby providing access to the water 12 through said ice layer 11.

Placing the mass on the ice is the only work required. When it is desired to make a hole in thick ice, the initial compact mass of freezing point depressant may be substantially used up before obtaining the desired depth and hole size. In that case, the method of the present invention may be repeated until a hole of the desired depth and size is obtained.

Freezing point depressant employed in the present invention is preferably substantially anhydrous, i.e., containing not more than 1 percent water, and is preferably in the form of a substantially spherical solid mass having dimensions corresponding to the size of the desired hole. However, it is to be understood that other shaped masses of freezing point depressant such as regular polyhedra, cylinders, and the like can be employed.

Figure 4:
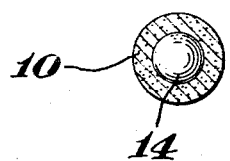
FIGURE 4 shows a cut away view of a specific embodiment of the compact mass of freezing point depressant used in accordance with the present invention.

For large diameter holes, a suitable substrate material 14, such as, for example, a hollow plastic shell, may be coated with freezing point depressant 10 as shown in FIGURE 4. In this manner, a large effective diameter mass of the freezing point depressant may be provided without excessive waste.

Suitable inorganic ionizable freezing point depressants for use in accordance with the present invention are $FeCl_3$, $NaCl$, $CaCl_2$, $MgCl_2$, $AlCl_3$ $Na_3PO_4$ and the like, and mixtures thereof, with $CaCl_2$ being preferred.

A better understanding of the present invention may be obtained in light of the following example which is set forth to illustrate, and is not to be construed to limit, the present invention.

*Example*

A four-inch diameter ball of substantially anhydrous calcium chloride is set by a fisherman on the upper surface of the ice covering a lake in winter. The ice is about six inches thick.

After a period of about 5 to 30 minutes, a hole is provided through which access to the lake is obtained.

Various modifications may be made in the present invention without departing from the spirit or scope thereof, and it is to be understood that I limit myself only as defined in the appended claim.

I claim:

In ice fishing a method of obtaining access to a body of water through a layer of surface ice comprising positioning a substantially compact mass of substantially anhydrous ionizable freezing point depressant coated over a substrate material at rest on and in contact with the upper surface of the ice layer and allowing said mass to remain in contact with said ice for a time sufficient to form and define a regular aperture in said ice, thereby establishing access between said upper layer of the ice and said body of water.

References Cited

UNITED STATES PATENTS

| | | | |
|---|---|---|---|
| 1,787,887 | 1/1931 | White et al. | 252—70 |
| 1,816,511 | 7/1931 | Barnes | 166—36 |
| 2,035,219 | 3/1936 | Booth | 252—70 |
| 2,988,509 | 6/1961 | Schilberg | 252—70 |

CHARLES E. O'CONNELL, *Primary Examiner.*

ERNEST R. PURSER, DAVID H. BROWN, *Examiners.*